US012491528B2

(12) United States Patent
Kong et al.

(10) Patent No.: US 12,491,528 B2
(45) Date of Patent: Dec. 9, 2025

(54) SIDE-PRESS SWITCH WATER OUTLET APPARATUS FOR SHOWER

(71) Applicant: Xiamen GSH Technology CO., LTD., Xiamen (CN)

(72) Inventors: Sheng Kong, Xiamen (CN); Yiqun Lin, Xiamen (CN); Shaochun Lin, Xiamen (CN)

(73) Assignee: Xiamen GSH Technology CO., LTD., Xiamen (CN)

( * ) Notice: Subject to any disclaimer, the term of this patent is extended or adjusted under 35 U.S.C. 154(b) by 301 days.

(21) Appl. No.: 18/338,537

(22) Filed: Jun. 21, 2023

(65) Prior Publication Data

US 2023/0415184 A1 Dec. 28, 2023

(30) Foreign Application Priority Data

Jun. 22, 2022 (CN) ......................... 202221565534.5

(51) Int. Cl.

*B05B 12/00* (2018.01)
*B05B 1/16* (2006.01)
*B05B 1/18* (2006.01)

(52) U.S. Cl.

CPC .......... *B05B 12/002* (2013.01); *B05B 1/1636* (2013.01); *B05B 1/18* (2013.01)

(58) Field of Classification Search

CPC ....... B05B 1/16; B05B 1/1627; B05B 1/1636; B05B 1/18; B05B 12/002; B05B 12/0022
See application file for complete search history.

(56) References Cited

U.S. PATENT DOCUMENTS

| | | | | | |
|---|---|---|---|---|---|
| 5,433,384 | A * | 7/1995 | Chan | B05B 3/04 239/239 |
| 10,132,423 | B1 * | 11/2018 | Lan | F16K 31/602 |
| 2011/0024516 | A1 * | 2/2011 | Li | B05B 1/1636 239/443 |
| 2012/0305116 | A1 * | 12/2012 | Zhou | B05B 1/1636 137/625.46 |
| 2017/0100728 | A1 * | 4/2017 | Gong | B05B 1/18 |
| 2017/0136473 | A1 * | 5/2017 | Yu | A47K 3/28 |
| 2020/0001314 | A1 * | 1/2020 | Yang | A47K 3/28 |
| 2020/0086332 | A1 * | 3/2020 | Huang | B05B 1/1627 |
| 2022/0176389 | A1 * | 6/2022 | Yu | B05B 1/18 |

FOREIGN PATENT DOCUMENTS

WO WO-2011079775 A1 * 7/2011 ........... B05B 1/1654

* cited by examiner

*Primary Examiner* — Darren W Gorman
(74) *Attorney, Agent, or Firm* — Westbridge IP LLC

(57) ABSTRACT

Disclosed in the application is a side-press switch water outlet apparatus for a shower, including a valve body, a water outlet panel, a switching piece, a ratchet and a driving unit. The valve body is provided with a water inlet channel; the water outlet panel is at least provided with a first water outlet channel and a second water outlet channel; the switching piece is rotatably arranged on the valve body, and the water inlet channel switches water supply between the first water outlet channel and the second water outlet channel through the switching piece; the ratchet is connected with the switching piece in a circumferential limit way. According to the solution, the key of the driving unit moves in the direction perpendicular to the shower handle, which is more in line with the use habits of a user and improves the user experience.

11 Claims, 5 Drawing Sheets

SIDE-PRESS SWITCH WATER OUTLET APPARATUS FOR SHOWER

CROSS-REFERENCE TO RELATED APPLICATIONS

This application claims priority to Chinese Patent Application No. 202221565534.5, filed on Jun. 22, 2022, the content of which is incorporated herein by reference in its entirety.

TECHNICAL FIELD

The application relates to the field of bathroom apparatuses, in particular to a side-press switch water outlet apparatus for a shower.

BACKGROUND

For an existing shower switch apparatus, a push button or a button is usually arranged on a front surface of a shower handle, and a ratchet mechanism is driven by driving the push button or the button, so as to drive a switching piece to rotate to switch a water outlet channel. However, a user holds both sides of the handle tightly during normal use. Therefore, when the water outlet channel needs to be switched, the user must change the hand-held direction to operate the button or push button on the front surface of the shower handle, and then adjust the hand-held direction back to the normal use of the shower after the switch is completed, which is inconvenient for the user and leads to poor user experience.

SUMMARY

The application provides a side-press switch water outlet apparatus for a shower. According to the solution, a key of a driving unit moves in a direction perpendicular to a shower handle, which is more in line with use habits of the user and improves the user experience.

In order to achieve the above objective, the application employs a technical solution as follows: a side-press switch water outlet apparatus for a shower, including: a valve body, a water outlet panel, a switching piece, a ratchet and a driving unit.

The valve body is provided with a water inlet channel.

The water outlet panel is at least provided with a first water outlet channel and a second water outlet channel.

The switching piece is rotatably arranged on the valve body, and the water inlet channel switches water supply to the first water outlet channel and the second water outlet channel through the switching piece.

The ratchet is connected with the switching piece in a circumferential limit way, and the ratchet is provided with a plurality of ratchet teeth in the circumferential direction.

The driving unit includes a key and a driving part. The key is arranged on a sidewall of a shower handle and moves in a direction perpendicular to the shower handle. The driving part is in driving fit with the key and the ratchet teeth respectively. The driving part abuts against and is in driving fit with the ratchet teeth during forward movement thereof, and the driving part is in avoiding fit with the ratchet teeth during reverse movement thereof.

Preferably, the driving unit further includes a positioning piece. The positioning piece moves between a limiting position for limiting the ratchet teeth and an avoiding position for avoiding the ratchet teeth. In the process that the driving part drives the ratchet to move forward, the positioning piece moves toward the avoiding position, and the positioning piece can prevent the ratchet from rotating reversely.

Preferably, the ratchet is rotatably installed on the valve body, friction force between the ratchet and the valve body is greater than friction force between the driving part and the ratchet teeth, and then the ratchet can overcome the friction force between the driving part and the ratchet teeth and remain in the current position during the reverse movement of the driving part.

Preferably, an elastic piece for providing elastic force to the key is further included. The key can be reset to an initial position under the action of the elastic force, and the driving part can be driven to move reversely during the reset process of the key.

Preferably, the driving unit further includes a transmission part arranged between the key and the driving part. The key is in linkage fit with one end of the transmission part, and the driving part is in linkage fit with the other end of the transmission part.

Preferably, the transmission part slides in a direction perpendicular to the shower handle, or the transmission part slides in a direction at an included angle with the shower handle.

Preferably, the driving unit further includes a connecting piece. An insertion slot is formed at one end of the transmission part, one end of the connecting piece is in insertion fit with the insertion slot, and then the connecting piece and the transmission part are limited in a mutually perpendicular direction. The other end of the connecting piece is in insertion fit with the key, and then the connecting piece and the key are limited in the mutually perpendicular direction.

Preferably, a limiting groove is formed at the other end of the transmission part, and one end of the driving part is in rotary sliding fit with the limiting groove.

Preferably, an installation seat fixedly installed in the valve body is further included. The switching piece is arranged between the water outlet panel and the installation seat.

Preferably, the ratchet is installed on the side, away from the switching piece, of the installation seat. The installation seat is provided with an avoiding hole. The switching piece is provided with a connecting shaft penetrating the avoiding hole, and the ratchet is connected with the connecting shaft in a clamping way.

Preferably, the driving unit is installed on the side, away from the switching piece, of the installation seat.

Preferably, the driving part is a driving hook which is in clamping fit with the ratchet teeth of the ratchet.

Preferably, the key is arranged in a sliding way, and the driving part is arranged in a rotating way on the water outlet apparatus.

The beneficial effects of the application are as follows.

The side-press switch water outlet apparatus for the shower in the application includes a valve body, a water outlet panel, a switching piece, a ratchet and a driving unit. The valve body is provided with a water inlet channel. The water outlet panel is at least provided with a first water outlet channel and a second water outlet channel. The switching piece is rotatably arranged on the valve body, and the water inlet channel switches water supply to the first water outlet channel and the second water outlet channel through the switching piece. The ratchet is connected with the switching piece in a circumferential limit way, and the ratchet is provided with a plurality of ratchet teeth in the circumferential direction. The driving unit includes a key and a driving part. The key is arranged on a sidewall of a shower handle and moves in a direction perpendicular to the shower handle. The driving part is in driving fit with the key and the ratchet teeth respectively. The driving part abuts against and is in driving fit with the ratchet teeth during forward movement thereof, and the driving part is in avoiding fit with the ratchet teeth during reverse movement thereof. According to the solution, the key of the driving unit moves in the direction perpendicular to the shower handle, which is more in line with the use habits of the user and improves the user experience.

The ratchet is rotatably installed on the valve body, the friction force between the ratchet and the valve body is greater than the friction force between the driving part and the ratchet teeth, and then the ratchet can overcome the friction force between the driving part and the ratchet teeth and remain in the current position during the reverse movement of the driving part, so that additional positioning pieces are not needed, product parts are reduced, the structure is simple, and the product cost is saved.

The transmission part slides in the direction at an included angle with the shower handle, so that the user operation can be more labor-saving, and locking can be prevented, which conforms to the ergonomic design.

BRIEF DESCRIPTION OF THE DRAWINGS

In order to clearly explain the technical solutions in the embodiments of the application, the drawings required in the descriptions of the embodiments will be briefly introduced below. It is apparent that the drawings in the following descriptions are some embodiments of the application. Those of ordinary skill in the art may also obtain other drawings in accordance with these drawings without paying creative labor.

DETAILED DESCRIPTION OF THE EMBODIMENTS

Figure 1:
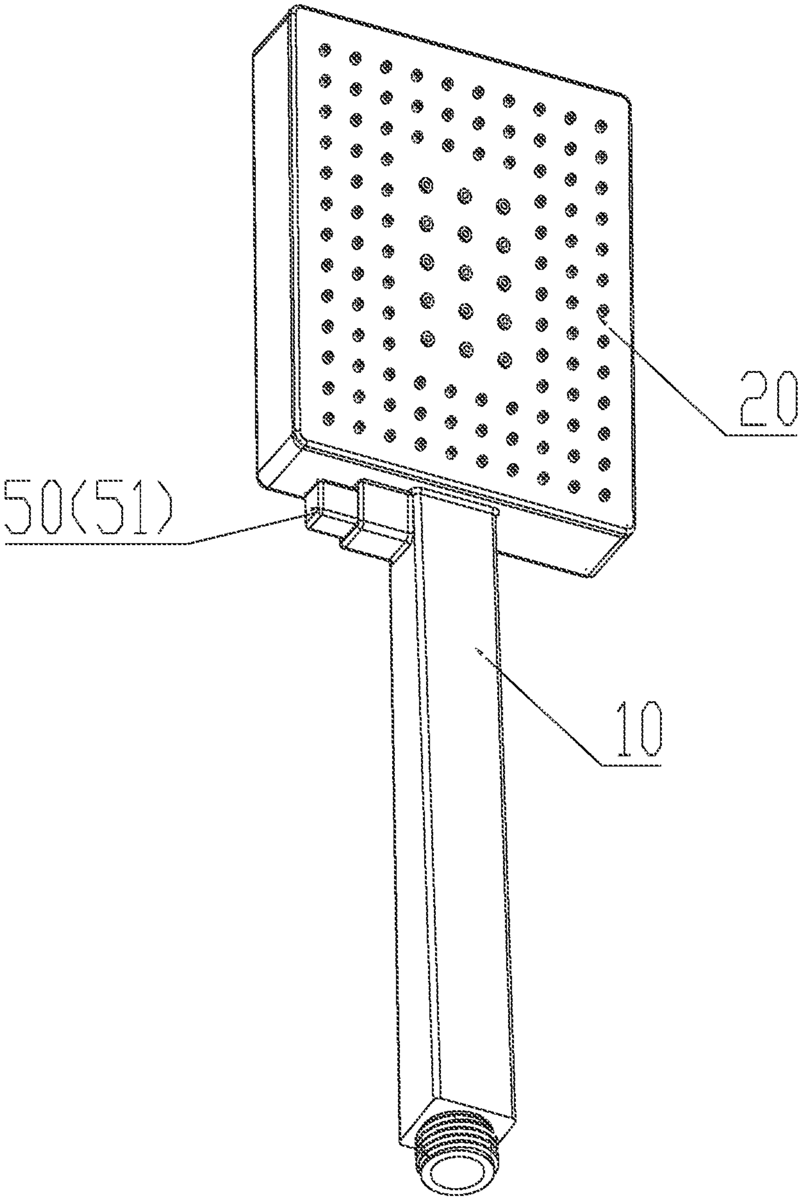
FIG. 1 is a solid diagram of a side-press switch water outlet apparatus for a shower in the application.
Figure 2:
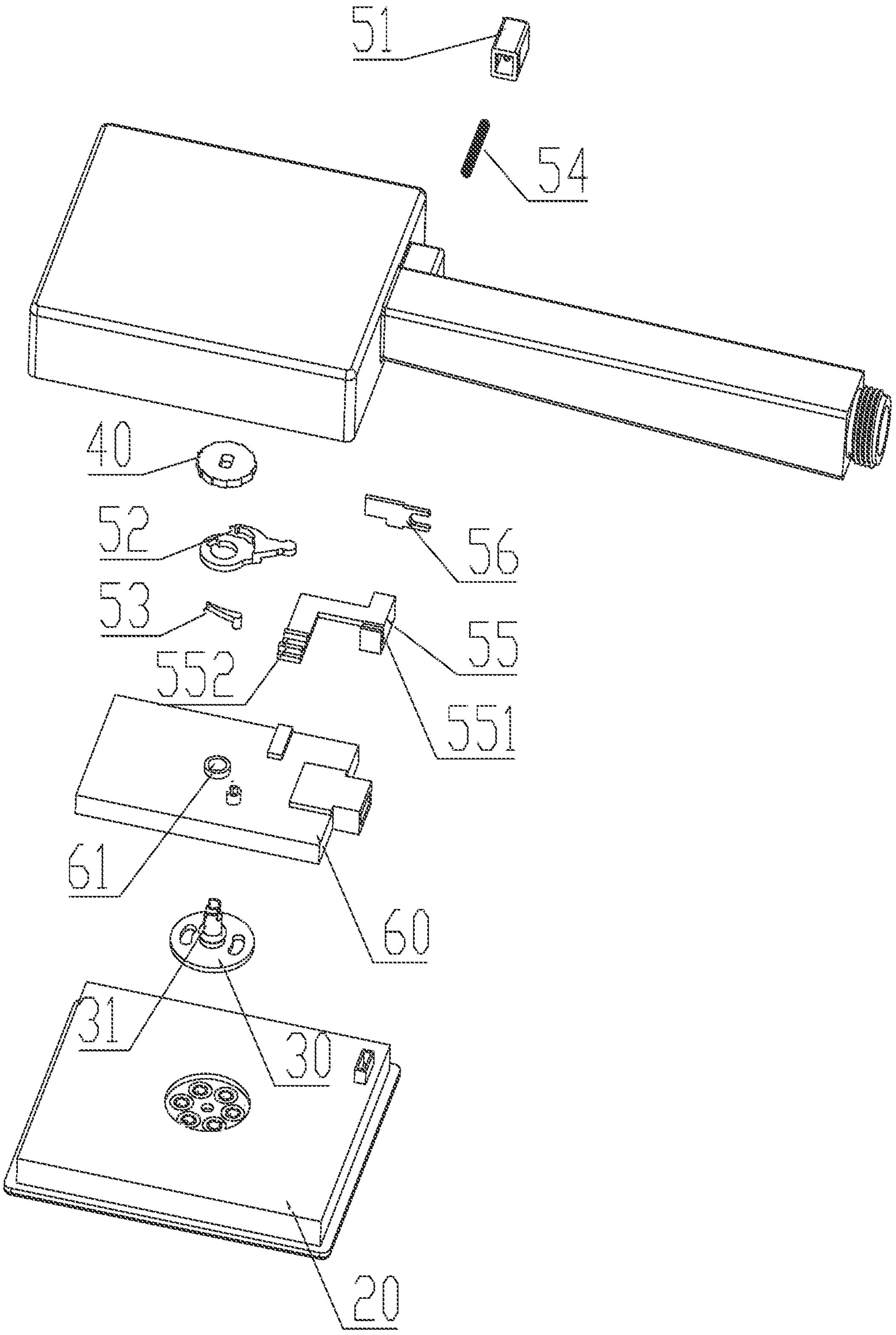
FIG. 2 is an exploded view of a side-press switch water outlet apparatus for a shower in the application.
Figure 3:
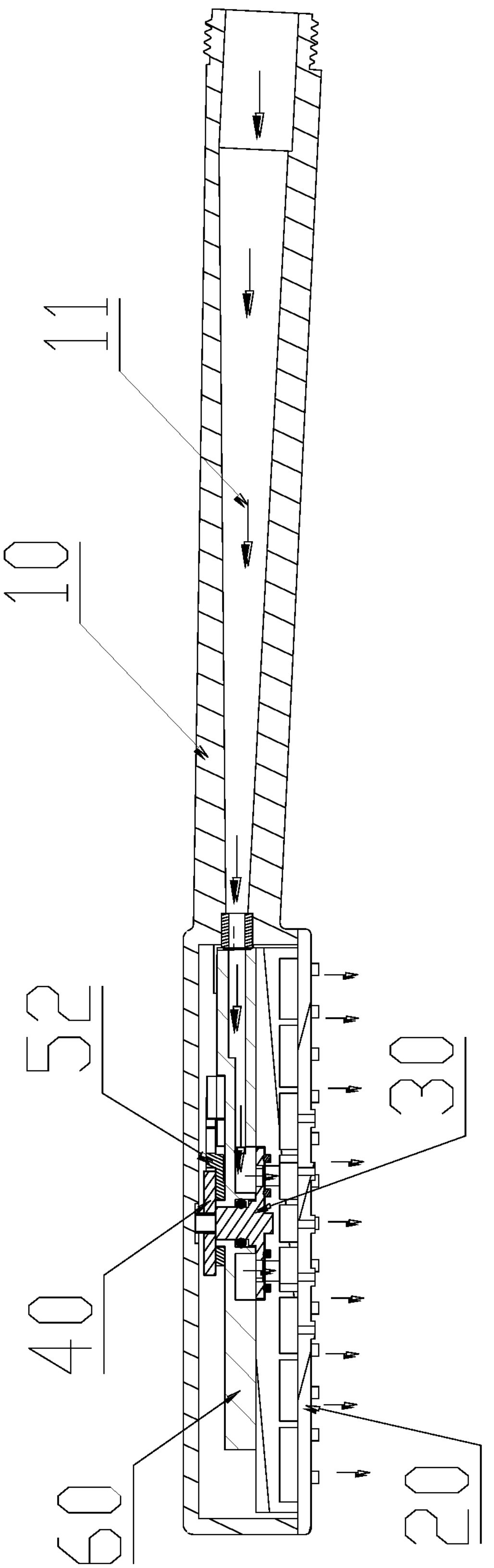
FIG. 3 is a sectional view I of a side-press switch water outlet apparatus for a shower in the application.
Figure 4:
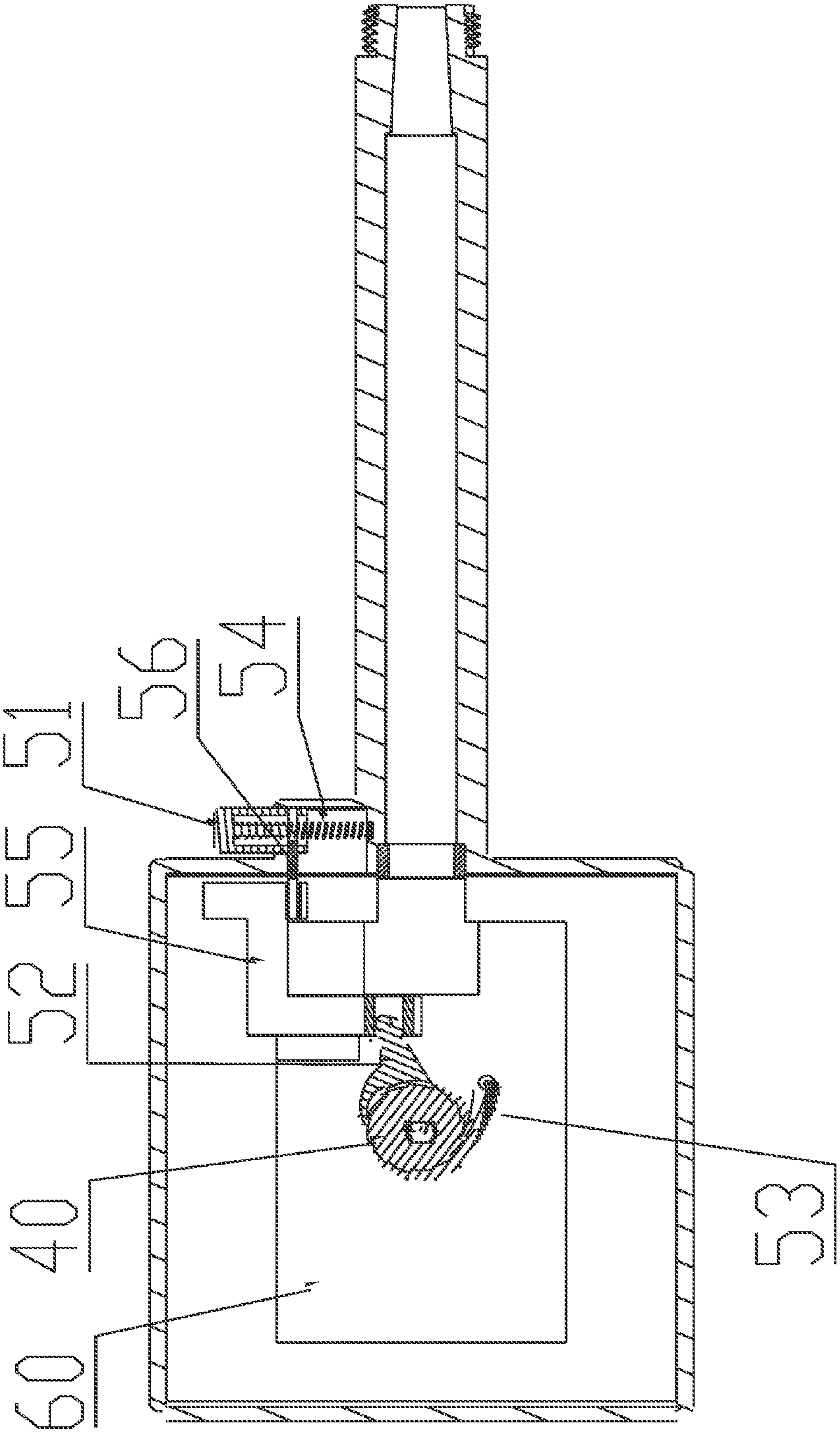
FIG. 4 is a sectional view II of a side-press switch water outlet apparatus for a shower in the application.

In order to make the above objects, features and advantages of the application more obvious and understandable, detailed description is made to the technical solution of the application with reference to the drawings and specific embodiments. It is to be noted that the described embodiments are not all embodiments but part of embodiments of the application. All other embodiments obtained by those of ordinary skill in the art on the basis of the embodiments in the application without creative work shall fall within the scope of protection of the application.

It is to be understood that the orientation or location relationships indicated by the terms "top" and "bottom" are orientation or location relationships shown on the basis of the drawings, which are only for the convenience of describing the application and simplifying the descriptions, rather than indicating or implying that the referred apparatuses or elements must have a specific orientation, and be constructed and operated in the specific orientation. Therefore, it cannot be understood as a limitation of the application.

Terms "first", "second" and "third" are only used for describing purposes, and cannot be understood as indicating or implying relative importance or implicitly indicating the number of indicated technical features. Therefore, the features defined with "first", "second" and "third" may include one or more features explicitly or implicitly. In the description of the application, unless otherwise stated, "a set of" means two or more.

Embodiment 1

As shown in FIGS. 1 to 4, a side-press switch water outlet apparatus for a shower includes: a valve body 10, a water outlet panel 20, a switching piece 30, a ratchet 40 and a driving unit 50.

The valve body 10 is provided with a water inlet channel 11.

The water outlet panel 20 is at least provided with a first water outlet channel and a second water outlet channel.

The switching piece 30 is rotatably arranged on the valve body 10, and water supply is switched to the first water outlet channel and the second water outlet channel through the switching piece 30.

The ratchet 40 is connected with the switching piece 30 in a circumferential limit way, and the ratchet 40 is provided with a plurality of ratchet teeth in the circumferential direction.

The driving unit 50 includes a key 51, a driving part 52 and a positioning piece 53. The key 51 is arranged on a sidewall of a shower handle and moves in a direction perpendicular to the shower handle. The driving part 52 is in driving fit with the key 51 and the ratchet teeth respectively. The driving part 52 abuts against and is in driving fit with the ratchet teeth during forward movement thereof, and the driving part 52 is in avoiding fit with the ratchet teeth during reverse movement thereof. The positioning piece 53 moves between a limiting position for limiting the ratchet teeth and an avoiding position for avoiding the ratchet teeth. In the process that the driving part 52 drives the ratchet 40 to move forward, the positioning piece 53 moves toward the avoiding position, and the positioning piece 53 can prevent the ratchet 40 from rotating reversely.

In the embodiment, an elastic piece 54 for providing elastic force to the key 51 is further included. The key 51 can be reset to an initial position under the action of the elastic force, and the driving part 52 can be driven to move reversely during the reset process of the key 51.

In the embodiment, the driving unit 50 further includes a transmission part 55 arranged between the key 51 and the driving part 52. The key 51 is in linkage fit with one end of the transmission part 55, and the driving part 52 is in linkage fit with the other end of the transmission part 55.

In the embodiment, the transmission part 55 slides in a direction perpendicular to the shower handle.

In the embodiment, the driving unit 50 further includes a connecting piece 56. An insertion slot 551 is formed at one end of the transmission part 55, one end of the connecting piece 56 is in insertion fit with the insertion slot 551, and then the connecting piece 56 and the transmission part 55 are limited in a mutually perpendicular direction. The other end of the connecting piece 56 is in insertion fit with the key 51, and then the connecting piece 56 and the key 51 are limited in the mutually perpendicular direction.

In the embodiment, a limiting groove 552 is formed at the other end of the transmission part 55, and one end of the driving part 52 is in rotary sliding fit with the limiting groove 552.

In the embodiment, an installation seat 60 fixedly installed in the valve body 10 is further included. The switching piece 30 is arranged between the water outlet panel 20 and the installation seat 60.

In the embodiment, the ratchet 40 is installed on the side, away from the switching piece 30, of the installation seat 60. The installation seat 60 is provided with an avoiding hole 61. The switching piece 30 is provided with a connecting shaft 31 penetrating the avoiding hole 61, and the ratchet 40 is connected with the connecting shaft 31 in a clamping way.

In the embodiment, the driving unit 50 is installed on the side, away from the switching piece 30, of the installation seat 60.

In the embodiment, the driving part 52 is a driving hook which is in clamping fit with the ratchet teeth of the ratchet 40.

In the embodiment, the key 51 is arranged in a sliding way, and the driving part 52 is arranged in a rotating way.

The specific operating process of the embodiment is as follows.

The key 51 moves in the direction perpendicular to the shower handle, and the key 51 drives the driving part 52 to rotate by means of the transmission part 55. In the process that the driving part 52 drives the ratchet 40 to rotate forward, the positioning piece 53 moves toward the avoiding position, and then drives the switching piece 30 to rotate to switch a water route. Moreover, the positioning piece 53 can prevent the ratchet 40 from moving reversely, causing the ratchet 40 to be positioned in the current position. When the key 51 is reset, the driving part 52 is driven by the transmission part 55 to reset.

In the solution, the key 51 of the driving unit 50 moves in the direction perpendicular to the shower handle, which is more in line with the use habits of the user and improves the user experience.

Embodiment 2

Figure 5:
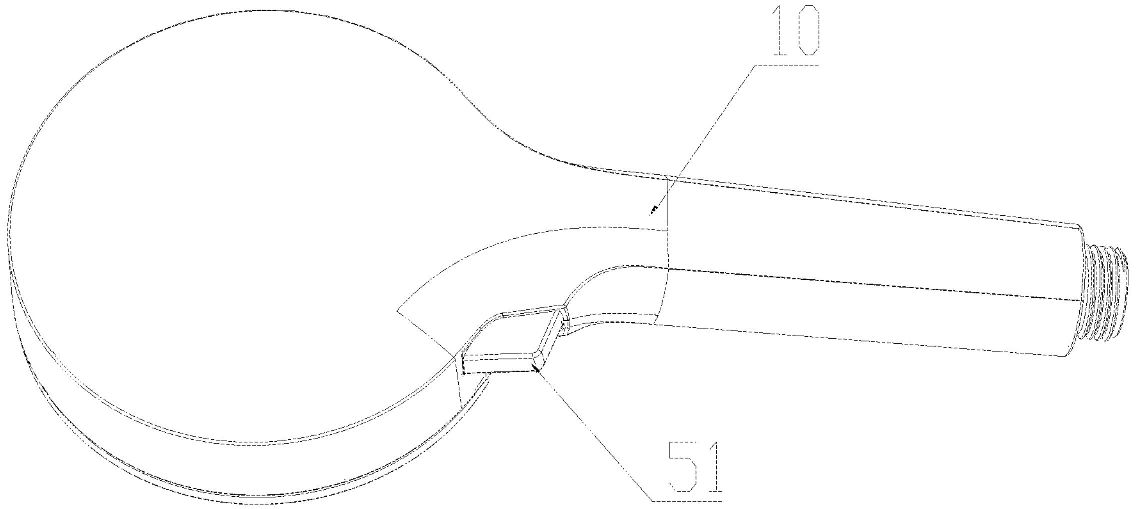
FIG. 5 is a solid diagram of a side-press switch water outlet apparatus for a shower according to another embodiment in the application.
Figure 6:
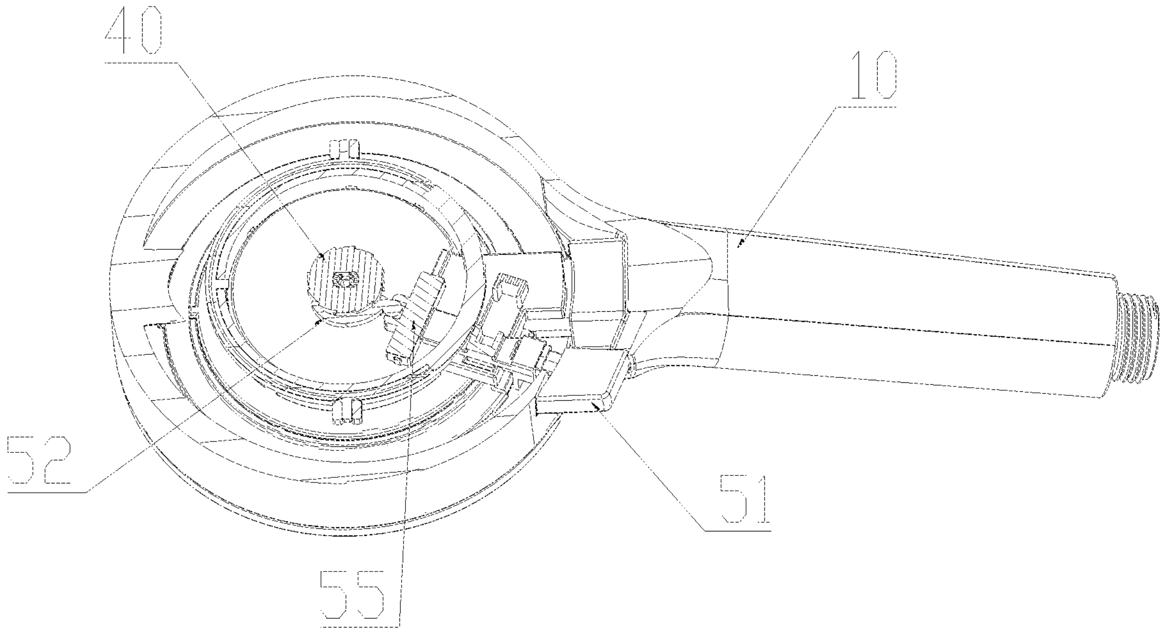
FIG. 6 is a sectional view of a side-press switch water outlet apparatus for a shower according to another embodiment in the application.

As shown in FIGS. 5 and 6, the main differences between the embodiment and the above embodiment lie in that the ratchet 40 is rotatably installed on the valve body 10, the friction force between the ratchet 40 and the valve body 10 is greater than the friction force between the driving part 52 and the ratchet teeth, and then the ratchet 40 can overcome the friction force between the driving part 52 and the ratchet teeth and remain in the current position during the reverse movement of the driving part 52.

In the embodiment, the transmission part 55 slides in the direction at an included angle with the shower handle, so that the operation can be more labor-saving, and locking can be prevented, which conforms to the ergonomic design.

Other unmentioned parts are consistent with the above embodiments, and will not be described here.

The above embodiments only express several implementation manners of the application, and their descriptions are more specific and detailed, but they cannot be understood as limiting the scope of the patent for the application. It is to be pointed out that, for those of ordinary skill in the art, without departing from the concept of the application, several modifications and improvements may also be made, which all fall within the scope of protection of the application. Therefore, the scope of protection of the patent for the application shall be subject to the appended claims.

What is claimed is:

1. A side-press switch water outlet apparatus for a shower, comprising:

a valve body, provided with a water inlet channel;

a water outlet panel, at least provided with a first water outlet channel and a second water outlet channel;

a switching piece, rotatably arranged on the valve body, wherein the switching piece is configured to switch water supply between the first water outlet channel and the second water outlet channel;

a ratchet, connected with the switching piece in a circumferential limit way, wherein the ratchet is provided with a plurality of ratchet teeth in the circumferential direction; and a driving unit, comprising a key and a driving part, wherein the key is arranged on a sidewall of a shower handle and moves in a direction perpendicular to the shower handle, the driving part is in driving fit with the key and the ratchet teeth respectively, the driving part abuts against and is in driving fit with the ratchet teeth during forward movement thereof, and the driving part is in avoiding fit with the ratchet teeth during reverse movement thereof;

wherein the driving unit further comprises a transmission part arranged between the key and the driving part, the key is in linkage fit with one end of the transmission part, and the driving part is in linkage fit with the other end of the transmission part;

wherein the transmission part slides in a direction perpendicular to the shower handle, or the transmission part slides in a direction at an included angle with the shower handle.

2. The side-press switch water outlet apparatus for a shower according to claim 1, wherein the driving unit further comprises a positioning piece, the positioning piece moves between a limiting position for limiting the ratchet teeth and an avoiding position for avoiding the ratchet teeth, and in the process that the driving part drives the ratchet to move forward, the positioning piece moves toward the avoiding position, and the positioning piece is capable of preventing the ratchet from rotating reversely.

3. The side-press switch water outlet apparatus for a shower according to claim 1, wherein the ratchet is rotatably installed on the valve body, a friction force between the ratchet and the valve body is greater than a friction force between the driving part and the ratchet teeth, and then the ratchet is capable of overcoming the friction force between the driving part and the ratchet teeth and remaining in the current position during the reverse movement of the driving part.

4. The side-press switch water outlet apparatus for a shower according to claim 1, further comprising an elastic piece for providing elastic force to the key, wherein the key is capable of being reset to an initial position under the action of the elastic force, and the driving part is capable of being driven to move reversely during the reset process of the key.

5. The side-press switch water outlet apparatus for a shower according to claim 1, wherein the driving unit further comprises a connecting piece, an insertion slot is formed at one end of the transmission part, one end of the connecting piece is in insertion fit with the insertion slot, and then the connecting piece and the transmission part are limited in a mutually perpendicular direction, the other end of the connecting piece is in insertion fit with the key, and then the connecting piece and the key are limited in the mutually perpendicular direction.

6. The side-press switch water outlet apparatus for a shower according to claim 1, wherein a limiting groove is formed at the other end of the transmission part, and one end of the driving part is in rotary sliding fit with the limiting groove.

7. The side-press switch water outlet apparatus for a shower according to claim 1, further comprising an installation seat fixedly installed in the valve body, wherein the switching piece is arranged between the water outlet panel and the installation seat.

8. The side-press switch water outlet apparatus for a shower according to claim 7, wherein the ratchet is installed on the side, away from the switching piece, of the installation seat, the installation seat is provided with an avoiding hole, the switching piece is provided with a connecting shaft penetrating the avoiding hole, and the ratchet is connected with the connecting shaft in a clamping way.

9. The side-press switch water outlet apparatus for a shower according to claim 7, wherein the driving unit is installed on the side, away from the switching piece, of the installation seat.

10. The side-press switch water outlet apparatus for a shower according to claim 1, wherein the driving part is a driving hook which is in clamping fit with the ratchet teeth of the ratchet.

11. The side-press switch water outlet apparatus for a shower according to claim 1, wherein the key is arranged in a sliding way, and the driving part is arranged in rotating way.

* * * * *